United States Patent [19]

Golinelli et al.

[11] Patent Number: 4,910,879
[45] Date of Patent: Mar. 27, 1990

[54] PROBE FOR USE IN APPARATUS FOR CHECKING LINEAR DIMENSIONS OF MECHANICAL PIECES

[75] Inventors: Guido Golinelli, Bologna; Carlo Dall'Aglio, Volta Reno Di Argelato; Narciso Selleri, Monteveglio, all of Italy

[73] Assignee: Marposs Societa' per Azioni, S. Marino di Bentivoglio (BO), Italy

[21] Appl. No.: 461,754

[22] Filed: Jan. 28, 1983

[30] Foreign Application Priority Data

Feb. 23, 1982 [IT] Italy .................. 3344 A/82

[51] Int. Cl.⁴ .................................. G01B 3/22
[52] U.S. Cl. .......................... 33/832; 33/559
[58] Field of Search ............ 277/212 FB, 230, 237 A, 277/DIG. 4; 74/18.2, 18.1; 33/148, 147, 178 E, 169 R, 174 L, 149, 832, 559, 558, 561; 409/126

[56] References Cited

U.S. PATENT DOCUMENTS

| 2,567,071 | 9/1951 | Jacobus | 74/18.2 X |
| 3,766,653 | 10/1973 | McKay | 33/174 L |
| 4,175,331 | 11/1979 | Johnson | 33/172 E |
| 4,279,079 | 7/1981 | Gamberini et al. | 33/149 J |
| 4,370,812 | 2/1983 | Possati | 33/169 R |

FOREIGN PATENT DOCUMENTS

| 0138360 | 10/1979 | Fed. Rep. of Germany | 33/174 L |
| 664927 | 6/1964 | Italy | 33/147 K |
| 3528A/79 | 10/1979 | Italy . | |
| 3439A/80 | 6/1980 | Italy . | |

Primary Examiner—Harry N. Haroian
Attorney, Agent, or Firm—Stevens, Davis, Miller & Mosher

[57] ABSTRACT

Probe for use in apparatus for checking linear dimensions of mechanical pieces including a support, an arm-set carried by the support and having a movable arm carying a feeler for contacting the piece to be checked, and a protective diaphragm coupled to the support and the movable arm; the protective diaphragm includes a cloth core and a rubber coating.

25 Claims, 2 Drawing Sheets

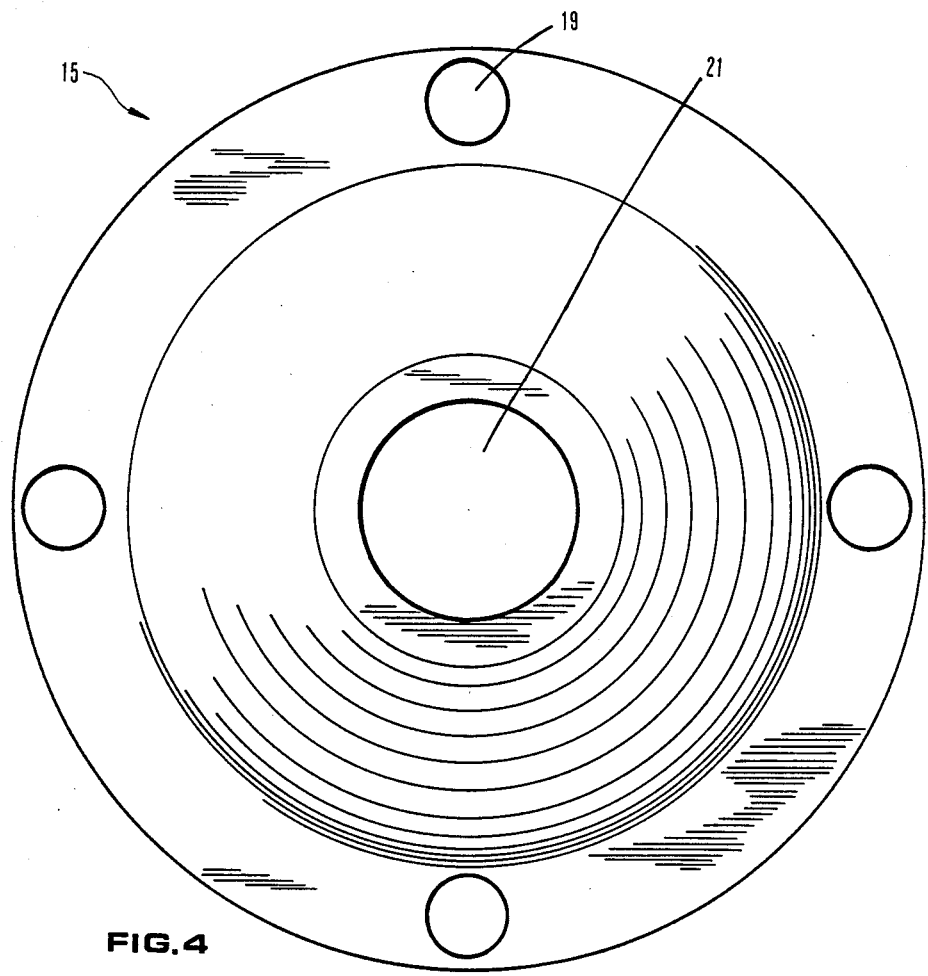

PROBE FOR USE IN APPARATUS FOR CHECKING LINEAR DIMENSIONS OF MECHANICAL PIECES

The present invention relates to a probe for use in apparatus for checking linear dimensions of mechanical pieces with a support, an arm-set fixed to the support and having a movable arm carrying a feeler for contacting a piece to be checked, and a resilient protective diaphragm coupled to the support and the movable arm.

There are already known probes for use in apparatus for checking linear dimensions of mechanical pieces, for example, gauging heads and "touch trigger" heads, comprising a support casing, an arm-set, with a movable arm, support by the casing, and a protective diaphragm coupled to the movable arm and the casing.

For example, in U.S. Pat. No. 4,279,079 there is described gauging head suitable for application on grinding machines, including cylindrical casing, two arms fixed inside the casing and pivotable about associated fulcrums, two feelers located at the arm ends outside the casing, sealing gaskets coupled to the movable arms and the casing and a protective rubber diaphragm coupled to the casing and to the movable arms, in an external position with respect to the sealing gaskets; the protective diaphragm has a honeycomb structure, is very flexible, but resists to the impact of foreign matter, and serves to protect the sealing gaskets from impacts of any foreign matter.

This known gauging head is subject to some inconveniences. The protective diaphragm is not sufficiently resistant and its honeycomb structure lets oil easily deposit on the diaphragm, so diminishing its flexibility and varying the resistance that the diaphragm opposes to displacements of the movable arms. Furthermore the head is unfit for applications on lathes or similar machine tools, as in the working process of these machines there are produced incandescent chips that can easily burn or cut the diaphragm, and consequently impair the protection for the sealing gaskets, that, in turn, can irreparably be damage by chips.

A first object of the invention is to realize a probe for checking linear dimensions of mechanical pieces that is provided with a protective diaphragm having the necessary characteristics for guaranteeing a more efficient protection than that provided by the conventional heads.

Another object of the invention is that of providing a probe with a protective diaphragm that has resilience features remaining substantially constant in the long run.

A further object of the invention is to provide a probe with suitable protective and sealing means that render it particularly appropriate for applications on lathes.

These and other objects and advantages, that will become more evident from the detailed description that follows, are attained through a probe of the type hereinbefore mentioned, wherein, according to the invention, said protective diaphragm includes a core, substantially made of cloth, and a coating made of resilient material.

The invention is described in detail with reference to the accompanying drawings, given by way of non limiting example, in which:

FIG. 3 is a sectional view of a protective diaphragm that is particularly suitable for probes to be applied on lathes;

FIG. 4 is a plan view of the diaphragm of FIG. 3; and

Figure 1:
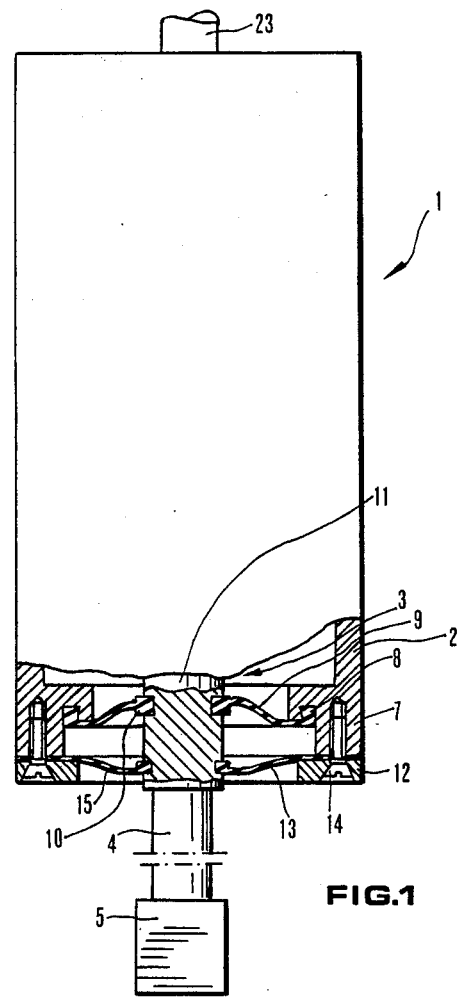
FIG. 1 is a partially sectional view of a probe head that is particularly suitable for checking pieces machined or to be machined on lathes and/or for checking turning tools, showing a first embodiment of the invention.

In FIG. 1 there is shown a probe or head 1 that is suitable for checking pieces on lathes or for checking turning tools. Head 1 includes an outer support casing 2 that carries an arm-set 3. Arm-set 3, substantially housed within casing 2, includes an arm 4, that bears at its free end, located outside casing 2, a feeler 5 with a substantially cubic shape.

Arm-set 3, whose specific structure does not concern the present invention, is made in such a way so as to allow arm 4 to pivot about two perpendicular axes, one of which is perpendicular to the plane of FIG. 1 and the other lies in said plane, in a horizontal direction.

Arm-set 3 has a plurality of electrical switches that trigger as a consequence of the displacement of arm 4 from the rest position, shown in FIG. 1. Head 1 is consequently of the "tough-trigger" or contact sensing type and it is particularly suitable for checking turning tools, or - possibly by using a feeler with a different shape than the cubic one - mechanical pieces before or after their machining on a lathe.

As it is well known, the touch signal provided by these probes is used to control reading of linear, rotary or other trandsucers associated with the lathe or other machines a providing, with the probe, a measurement system or apparatus.

Base 7 of casing 2 has a seat 8 for housing a peripheral projecting part of a sealing gasket 9, made of rubber. Gasket 9, which is arranged substantially within casing 2, has a central hole and a projecting part or border 10, adjacent to the central hole, that is interference fitted to a grove formed in a cylinderical rod 11 of arm 4.

A base plate 12 has a central hole or opening 13 for the passage of arm 4, and it is clamped, by means of four screws 14, to the lower part of base 7 of casing 2.

Between plate 12 and the lower end of base 7 there is inserted the peripheral border of a protective membrane or diaphragm 15, that serves to protect gasket 9 from the incandescent chips removed by the machining operation of the lathe. Diaphragm 15 faces gasket 9, at a position external with respect to the position of gasket 9 within casing 2.

A probe head of the type previously described is shown in Italian Patent Application No. 3579A/81 filed on November 20, 1981.

According to the present invention, the protective diaphragm 15 is of the type shown in FIGS. 3 and 4. Diaphragm 15 has an internal core 16 made of a stainless steel wire cloth, with a considerably high "Mesh" and a sealing coating 17 made of synthetic rubber that is resistant to the coolants used in the operation of lathes or similar machine tools.

Diaphragm 15 has an annular border 18 with four holes 19 for the passage of screws 14, an intermediate curved part 20 and a central hole 21 limited by an annular projecting part 22.

Diaphragm 15 is produced by inserting, in a specifically shaped mould, core 16 obtained from a flat sheet of stainless steel cloth, suitably cut. The closing of the mould makes core 16 shape itself to the form shown in FIG. 3.

Possibly, the metal cloth, after cutting, can be shaped, by means of a suitable tool, and then be inserted in the mould.

Thereafter, in the hollow space of the mould, there is injected a synthetic liquid rubber that is thereafter vulcanized, so as to obtain coating 17. The shape of the hollow space of the mould is such that coating 17 is obtained as a single piece, including projecting part 22.

As an example, the diameter of diaphragm 15 is approx. 30 mm and the thickness of border 18 and of intermediate part 20 is approx. 1 mm. The wire of the cloth of core 16 has a diameter of 0.03 mm and the cloth has a "Mesh" of about 320 (corresponding to more than 15000 meshes per square cm).

Diaphragm 15 acts as a seal but, mainly, as a mechanical protection. In fact, the impact of incandescent chips against diaphragm 15 can burn coating 17, so impairing the sealing of diaphragm 15, but it cannot perforate the metal cloth of core 16, and consequently the chips cannot reach sealing gasket 9. Even the lateral surface of casing 2 and its upper base, for the passage of a cable 23, are liquidtight and dustproof and consequently no chips, coolants or other foreign matter can affect the elements of arm-set 3 arranged within casing 2.

The manufacturing techniques of the previously described diaphragm 15 have the advantage of enabling the attainment of projecting part 22 as a single piece with coating 17, which is undoubtedly preferable to the obtainment of projecting part 22 from a distant element, thereafter glued; in fact, a glued projecting part could detach itself and so affect the stability of the coupling diaphragm 15 to arm 4.

Obviously diaphragm 15, shown in FIGS. 3 and 4, can be advantageously used, together with a sealing gasket, if head 1 is a gauging or measuring head for lathes, for example of the type described in Italian Patent Application No. 3578A/81, filed on Nov. 20, 1981.

Diaphragm 15 is not always suitable for applications in gauging heads for grinders, as many times there is required in these heads to have the feelers subjected to contact forces considerably lower than those required in heads for lathes : core 16 is sufficiently resilient to allow displacements of arm 4 as a result of the application of contact forces between feeler 5 and the piece that are within the range of values foreseen for lathe applications, but this resilience is unsufficient in many applications for grinders.

Figure 2:
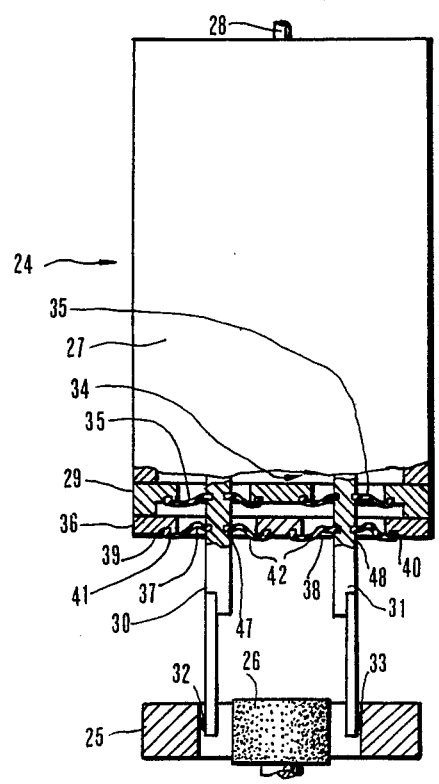
FIG. 2 is a partly sectional view of a gauging head with two feelers, for checking the diameter of a hole in the course of machining on a grinding machine, according to another embodiment of the invention.

The gauging probe or head 24 for inside diameter checking shown in FIG. 2 is suitable for gauging the diameter of holes of pieces, like bearing rings 25, while they are machined by a grinding machine with a wheel 26.

Head 24 has a cylindrical support casing 27, with an upper base—through which there is foreseen a liquid-tight and dustproof passage for a cable 28—and a lower base to which there is fixed, by means of screws not shown, a plate 29. Plate 29 has two holes for the passage of two movable arms 30 and 31 that carry—at their ends external with respect to casing 27—associated feelers 32 and 33. The head arm-set 34, that includes arms 30 and 31, can be of the type described in U.S. Pat. No. 4,279,079. Consequently arms 30 and 31 perform limited pivotal displacements about fulcrums and the arm-set is a gauging arm-set.

Movable arms 30 and 31 have annular seats wherein there are interference-fitted protruding parts that limit central holes of two sealing gaskets 35. Gaskets 35 have peripheral protruding parts interference-fitted in annular seats formed in plate 29.

By means of screws, not shown, there is clamplped to plate 29 another plate 36 that has two holes, 37 and 38, for the passage of arms 30 and 31.

Plate 36 has annular seats 39 and 40 wherein there are interference fitted peripheral projecting parts 41, of a substantially trapezoidal shape, of two protective diaphragms 42.

Figure 5:
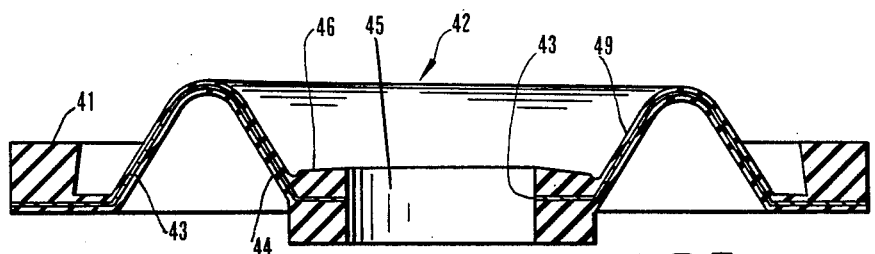
FIG. 5 is a sectional view of a protective diaphragm that is particularly suitable for gauging heads for application on grinding machines.

As shown in FIG. 5, diaphragms 42, which face gaskets 35 at external positions with respect to the gaskets, include an internal cloth core 43 and a synthetic rubber coating 44 resistant to the coolants normally used in grinding machines.

Each diaphragm 42 has a central hole 45 delimited by an annular projecting part 46 that is interference-fitted in seats 47 or 48 of arms 30 and 31. Projecting parts 41 and 46 are connected by a curved intermediate part 49.

Diaphragms 42 provide further sealing means for the support casing 27 and mechanical protections for preventing the entry of foreign matter, like chips and grinding wheel fragments, into casing 27.

The manufacturing techniques applied for the manufacture of diaphragms 42 are similar to those applied for diaphragms 15, shown in FIGS. 3 and 4, but there is used for core 43 a cotton cloth, or a cloth with a polyester resin insert, or even a cloth basically consisting of other natural, artificial or mixed textile fibres.

For example, the warp and weft of this cloth consist of 40 and 30 threads per cm respectively, the cloth thickness is 0.2 mm and the insert thickness can be of 0.14 mm. The thickness of diaphragm 42 at the intermediate section 49 is of 0.3 mm approx.

Diaphragms 42 are very compliant and consequently do not substantially hamper the displacements of arms 30 and 31 and, thanks to core 43, are resistant to the impact of foreign matter, more specifically, possible grinding wheel fragments, that do not reach temperature levels that could burn core 43.

It will of course be realized that the above embodiments can undergo other modifications and variants of constructional detail and design, equivalent from a functional and constructional point of view, without departing from the scope and ambit of the invention.

What is claimed is :

1. A probe for use in apparatus for checking linear dimensions of mechanical pieces, comprising a support, an arm-set fixed to the support and having a movable arm carrying a feeler for contacting a piece to be checked, and a resilient protective diaphragm coupled to the support and the movable arm, wherein said diaphragm includes a core, substantially made of cloth, and a coating made of resilient material.

2. The probe according to claim 1, wherein said core is substantially made of textile fibre.

3. The probe according to claim 2, wherein said textile fibre is basically of cotton.

4. The probe according to claim 1, wherein said cloth is made of metal.

5. The probe according to claim 4, wherein said metal cloth is made of stainless steel wire.

6. The probe according to claim 1, wherein said resilient coating has integrally formed projecting parts, for the diaphragm coupling.

7. The probe according to claim 6, wherein said resilient material consists of rubber.

8. The probe according to claim 1, further including a resilient sealtight gasket, coupled to the support and the movable arm, the gasket being located inside with respect to the support and the resilient protective diaphragm.

9. The probe according to claim 1, wherein said arm substantially accomplishes pivotal displacements and said diaphragm has a hole for the passage of the arm and a peripheral border adapted to be fitted to the support.

10. The probe according to claim 9, wherein said arm-set is a gauging arm-set.

11. The probe according to claim 9, wherein said arm-set is substantially of a touch trigger type for providing a trigger signal as a result of the feeler contacting the piece.

12. A probe for use in apparatus for checking linear dimensions of mechanical pieces, comprising:
a support casing defining at least an opening;
an arm-set carried by the support casing and housed substantially within the casing, the arm-set including an arm movable with respect to the support casing, the arm having an end passing through said opening;
a feeler coupled to said end of the movable arm, outside the support casing, for contacting a piece to be checked;
sealing means for sealing the support casing, the sealing means including a resilient flexible sealing gasket coupled to the movable arm and the support casing, the gasket permitting the movements of the arm;
a resilient diaphragm coupled to the arm and the support casing and arranged substantially in an external position with respect to the sealing gasket, wherein said diaphragm permits the movements of the arm and includes a core substantially made of cloth and a coating made of resilient material, the coating providing a further sealing means for the support casing and the core substantially providing a mechanical protection for the sealing gasket.

13. The probe according to claim 12, wherein said sealing gasket and said coating are made of rubber and said cloth is made of textile fibre.

14. The probe according to claim 12, wherein each of said sealing gasket and sadi diaphragm intergrally comprises rubber borders for interference coupling the gasket and the diaphragm to the movable arm and the support casing.

15. The probe according to claim 12, wherein said sealing gasket and said coating are made of rubber and said cloth is made of metal fibre.

16. The probe according to claim 15, wherein each of said sealing gasket and said diaphragm integrally comprises peripheral projecting parts made of rubber for coupling the gasket and the diaphragm to the movable arm and the support casing.

17. A gauging head for checking diameters of mechanical pieces during machining in grinding machines, comprising:
a cylindrical support casing defining at least an opening;
an arm-set carried by the support casing and housed substantially within the cylindrical support casing, the arm-set including two pivotally movable arms having relevant ends passing through said opening, the arms defining annular seats;
two feelers respectively coupled to said ends of the arms and arranged outside the casing for contacting the piece to be checked;
two sealing gaskets having projecting parts limiting relevant holes for the passage of the arms, the projecting parts being interference-fitted to relevant annular seats of the arms, the sealing gaskets further defining peripheral parts coupled to the casing; the gaskets being resilient to permit the pivotal movements of the arms;
two diaphragms, each coupled to the support casing and to a relevant movable arm the diaphragms being resilient to permit the pivotal movements of the arms and being arranged substantially in external positions with respect to the sealing gaskets, each diaphragm including a core substantially made of textile cloth and a coating providing further sealing means for the support casing, the diaphragms also providing mechanical protections for the sealing gaskets.

18. The gauging head according to claim 17, wherein the diaphragms comprise integral annular projecting parts for coupling with the movable arms and the casing.

19. The probe according to claim 1, wherein said diaphragm has an intermediate section with a thickness in the neighborhood of 0.3 mm.

20. The probe according to claim 19, wherein said cloth has a thickness in the neighborhood of 0.2 mm.

21. The probe accoridng to claim 20, wherein said cloth has warp and weft in the neighborhood of 40 and 30 threads per centimeter, respectively.

22. The probe according to claim 21, wherein the cloth comprises a polyester resin insert, the insert having a thickness in the neighborhood of 0.14 mm.

23. The probe according to claim 5, wherein said cloth has an intermediate part with a thickness in the neighborhood of 1 mm.

24. The probe according to claim 23, wherein the wire of the cloth has a diameter in the neighborhood of 0.03 mm.

25. The probe according to claim 24, wherein the cloth has a number of meshes per square centimeter in the neighborhood of 15,000.

* * * * *

UNITED STATES PATENT AND TRADEMARK OFFICE
CERTIFICATE OF CORRECTION

PATENT NO. : 4,910,879

DATED : March 27, 1990

INVENTOR(S) : Guido GOLINELLI et al

It is certified that error appears in the above-identified patent and that said Letters Patent is hereby corrected as shown below:

Column 1, line 19, --a-- should be inserted before "gauging".
Column 1, line 20, --a-- should be inserted before "cylindrical".
Column 2, line 37, "a" (first occurrence) should be --and--.
Column 2, line 44, "grove" should be --groove--; and "cylinderical" should be --cylindrical--.
Column 3, line 35, "distant" should be --distinct--.

Claim 14, line 2, "sadi" should be --said--; and "intergrally" should be --integrally--.
Claim 19, line 1, "1" should be --2--.

Signed and Sealed this

Third Day of September, 1991

Attest:

HARRY F. MANBECK, JR.

Attesting Officer

Commissioner of Patents and Trademarks